UNITED STATES PATENT OFFICE.

JOSEPH WURZNER, OF CHICAGO, ILLINOIS, ASSIGNOR, BY DIRECT AND MESNE ASSIGNMENTS, OF TWO-THIRDS TO HERMAN MEINKE AND EMIL H. BESSA, BOTH OF SAME PLACE.

COMPOSITION FOR BUILDING PURPOSES.

SPECIFICATION forming part of Letters Patent No. 339,726, dated April 13, 1886.

Application filed December 19, 1885. Serial No. 186,114. (No specimens.)

*To all whom it may concern:*

Be it known that I, JOSEPH WURZNER, a citizen of the United States of America, residing at Chicago, in the county of Cook and State of Illinois, have invented certain new and useful Improvements in Compositions for Building Purposes, of which the following is a specification.

My composition consists of the following ingredients, combined in the proportions stated, viz: pulverized brick, stone, or gravel, forty per cent.; vegetable fiber, thirty per cent.; slaked lime, twenty-five per cent.; common salt, five per cent.

The salt is first thoroughly mixed and dissolved in the water, added to the lime, and the whole ingredients are then thoroughly mixed to produce a stiff mortar.

This composition is applied direct by spreading it like plaster upon the roof-boards for roofing purposes, and for ceilings it is formed into plates, which, after being air-dried, are secured by nails under the joists of the room.

For bricks to build partitions or for wall-plates to be applied instead of laths and ordinary plaster, I can leave out the vegetable fiber and add proportionally more pulverized material.

This composition becomes rapidly hard with air-drying, is impervious to water, is not brittle, but will permit the driving of nails into and through it, and will not attract nor sweat out moisture.

By adding mineral coloring material any desired color can be given to the composition.

This composition is also fire-proof, and will stand as much pressure as any common brick.

I am aware that the several ingredients called for herein have been used in connection with other ingredients, and therefore I do not claim them except when combined as herein described.

What I claim, and desire to secure by Letters Patent, is—

1. The herein-described composition of matter to be used for building purposes, consisting of pulverized brick, stone, or gravel, vegetable fiber, slaked lime, and salt, in the proportions specified.

2. The herein-described composition of matter to be used for building purposes, consisting of pulverized brick, stone, or gravel, slaked lime, and salt, in the proportions specified.

In testimony whereof I affix my signature in presence of two witnesses.

JOSEPH WURZNER.

Witnesses:
RICHARD REINBOLD,
HARRIS W. HUEHL.